United States Patent [19]

Rowan, Jr.

[11] Patent Number: 5,016,338

[45] Date of Patent: May 21, 1991

[54] METHOD FOR ADJUSTING THE VERTICAL POSITION OF A FRAME ON A FOUNDATION

[76] Inventor: Robert L. Rowan, Jr., 3816 Dacoma St., Houston, Tex. 77092

[21] Appl. No.: 326,393

[22] Filed: Mar. 20, 1989

Related U.S. Application Data

[63] Continuation-in-part of Ser. No. 248,272, Sep. 21, 1988, abandoned, which is a continuation of Ser. No. 77,614, Jul. 22, 1987, abandoned, which is a continuation-in-part of Ser. No. 50,484, May 18, 1987, abandoned.

[51] Int. Cl.$^5$ .................... B23P 17/00; B32B 31/06; E04B 1/00
[52] U.S. Cl. ........................... 29/423; 52/741; 52/744; 264/35; 264/261; 264/263
[58] Field of Search ............. 248/678, 676, 680, 679, 248/673, 188.2, 188.4, 649, 650, DIG. 1; 52/167, 573, 126.5, DIG. 4, 741, 744; 264/261, 263, 35, 36; 29/423, 527.2, 559

[56] References Cited

U.S. PATENT DOCUMENTS

| | | | |
|---|---|---|---|
| 2,465,276 | 3/1949 | Ryder | 52/DIG. 4 X |
| 2,779,559 | 1/1957 | Bertuch | 248/638 X |
| 3,040,411 | 6/1962 | Messenger | 264/34 |
| 3,066,449 | 12/1962 | Cramer, Jr. | 248/678 X |
| 3,194,853 | 7/1965 | Weise et al. | 264/36 |
| 3,335,987 | 8/1967 | Woolslayer et al. | 248/649 |
| 3,361,410 | 1/1968 | Messer | 52/365 |
| 3,398,491 | 8/1968 | Babcock | 52/573 X |
| 4,240,995 | 12/1980 | Milne | 264/36 |
| 4,591,466 | 5/1986 | Murray et al. | 264/36 X |
| 4,626,299 | 12/1986 | Knight et al. | 264/261 X |
| 4,784,364 | 11/1988 | Chamberlain et al. | 248/678 X |

FOREIGN PATENT DOCUMENTS

| | | | |
|---|---|---|---|
| 54805 | 5/1977 | Japan | 248/678 |
| 625094 | 9/1978 | U.S.S.R. | 248/679 |
| 682722 | 8/1979 | U.S.S.R. | 248/679 |

*Primary Examiner*—Jan H. Silbaugh
*Assistant Examiner*—Karen D. Kutach

[57] ABSTRACT

A method for anchoring a machine or other load to a foundation requires the use of an adjustable support system. The system includes a base chock having a horizontal floor with an open slot formed in the floor to permit retrofitting around an installed anchor bolt. A frame chock is shaped to rest on the floor of the base chock; in many applications the frame chock is preferably poured in place around the anchor bolt. A retractable shim carrier, shaped to rest on the floor of the base chock between the floor and the frame chock, likewise has an open slot formed therein for insertion around the anchor bolt. One or more shims of varying thicknesses are shaped like the shim carrier to be inserted as needed, riding upon the shim carrier, between the floor of the base chock and the lower surface of the frame chock. The base chock can include small magnets, (or can be made of magnetic material and magnetized itself), and the shims and shim carrier can include magnetic material, to reduce shim bowing and slippage during installation and operation.

1 Claim, 4 Drawing Sheets

METHOD FOR ADJUSTING THE VERTICAL POSITION OF A FRAME ON A FOUNDATION

This is a continuation-in-part of Ser. No. 248,272, filed Sept. 21, 1988, now abandoned, which is a continuation of Ser. No. 077,614, filed July 22, 1987, now abandoned, which is a continuation-in-part of Ser. No. 050,484, filed May 18, 1987, now abandoned.

BACKGROUND OF THE INVENTION

This invention relates to an improved apparatus for supporting machinery or other load. It is known that machinery is subject to differential thermal expansion and contraction. These phenomena typically occur as a rotating machine warms up during startup or cools down after shutdown.

Because of expansion during heatup, adjustment is often required in the alignment of such a machine (which alignment is maintained by whatever system supports the machine) after the machine reaches operating temperature. However, the machine typically must be shut down for, and thus tends to cool down during, the realignment process. This cooldown can introduce inaccuracies into the alignment. Rapid adjustability is thus a desirable feature of a support system.

SUMMARY OF THE INVENTION

In accordance with the present invention, a support system for use in anchoring a machine or other load to a metal, grouted-concrete, or other foundation is disclosed. The system includes a base chock having a horizontal floor with an open slot formed in the floor. If the system is used in conjunction with a metal foundation, the base chock is fastened to the foundation, e.g., by bolting or grouting. If the system is used in conjunction with a grouted foundation, placement screws are provided to support the base chock so that its floor rests above the anticipated level of the surface of the grout.

A frame chock is shaped to rest on the floor of the base chock; in many applications the frame chock is preferably a poured-in-place chock. A shim carrier, shaped to rest on the floor of the base chock between said floor and the frame chock, likewise has an open slot and a retraction screwhole formed therein. One or more shims of varying thicknesses are shaped like the shim carrier to be inserted as needed upon the shim carrier between the floor of the base chock and the frame chock. The base chock can include small magnets, (or can be made of magnetic material and magnetized itself), and the shims and shim carrier can include magnetic material, to reduce shim slippage during installation and operation as well as bowing of the shims. If a grouted foundation is used, grout is poured around the base chock and allowed to set.

When the machine load is transferred to the support system, the load is supported, in turn, by the frame chock; any shims and/or the shim carrier if used; the floor of the base chock; and the foundation. The machine may be aligned by transferring the load to jackscrews or other known devices; inserting or removing shims on the retractable shim carrier, or the shim carrier alone, as desired; and finally retransferring the load to the system.

BRIEF DESCRIPTION OF THE DRAWINGS

FIG. 2 depicts a prefabricated frame chock, and FIG. 4 a poured-in-place frame chock.

Throughout the following detailed description, similar reference numerals refer to similar elements in all Figures of the drawings.

DETAILED DESCRIPTION OF SPECIFIC EMBODIMENTS

Figure 1:
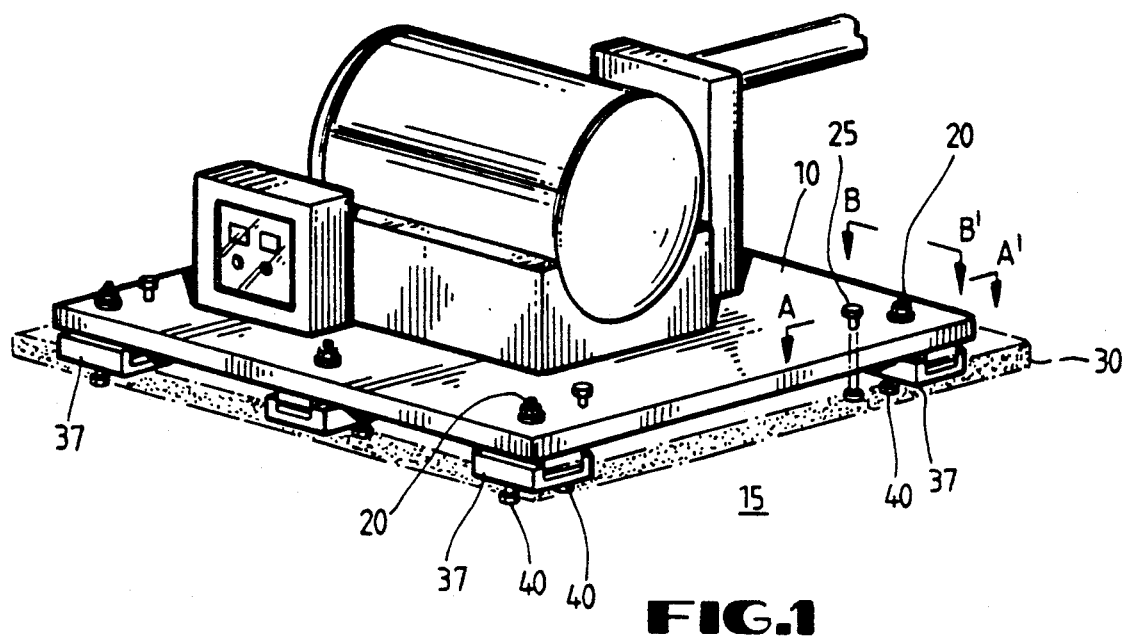
FIG. 1 is a perspective view of a machine or other weight anchored to a foundation in conjunction with a support system in accordance with the present invention.
Figure 2:
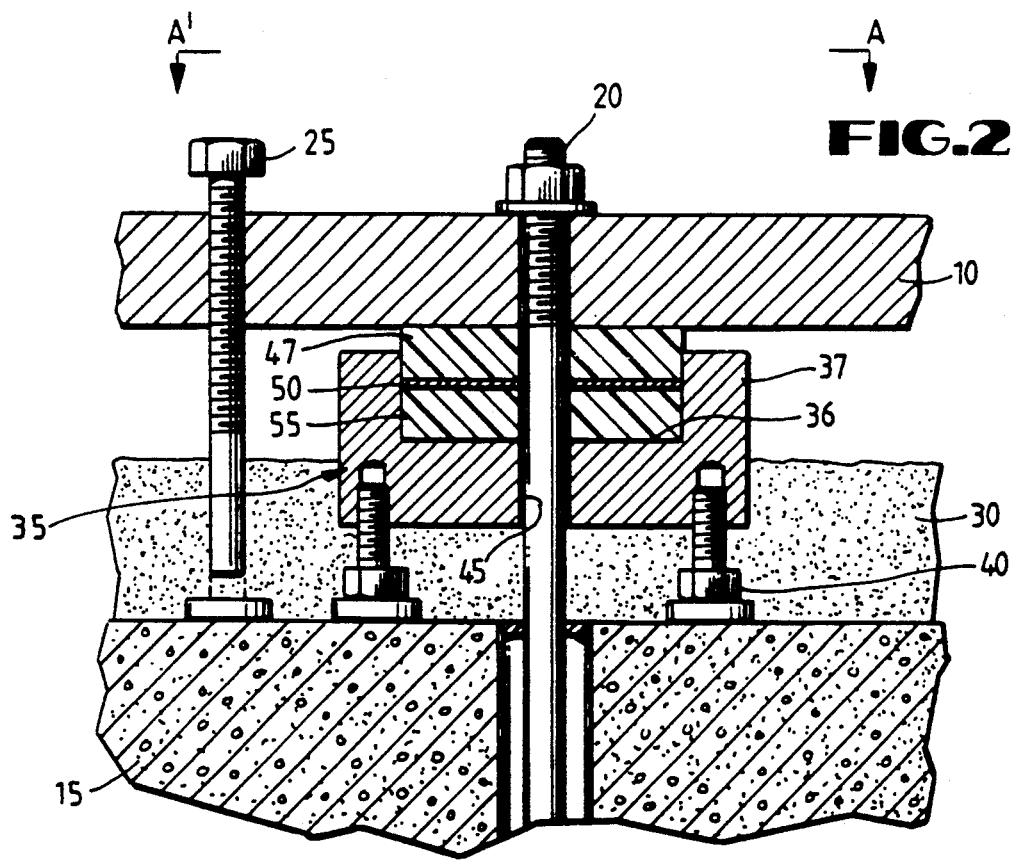
FIGS. 2 and 4 are sectional views of the support system, looking outward from the interior of the foundation, sectioned along the line A'—A.

FIGS. 1 and 2 depicts the frame 10 of a machine to be anchored to and supported by a foundation 15, which is typically constructed from concrete or steel. Anchoring is done by an anchor bolt 20. If the foundation is grouted, the portion of the anchor bolt 20 which will extend through the grout may be surrounded by a sleeve 22 to form a void around, and keep the grout away from, the anchor bolt. The top of the sleeve 22 can be sealed with putty or other suitable material to exclude grout contact.

As will already be known to those skilled in the art having the benefit of this disclosure, the frame 10 may initially rest on jacking bolts 25 or on other suitable means such as one or more hydraulic jacks. The goal in anchoring the frame 10 is of course ultimately to have the weight of the machine borne directly by the foundation 15, if the foundation is steel, or intermediately by grout 30 which is poured above and onto the foundation 15, as is typically seen with concrete foundations.

A base chock 35 rests on placement bolts 40, which in turn rest on or are anchored to the foundation 15. For stability purposes, the base chock 35 may include suitable threaded openings to receive the placement bolts 40.

Figure 3:
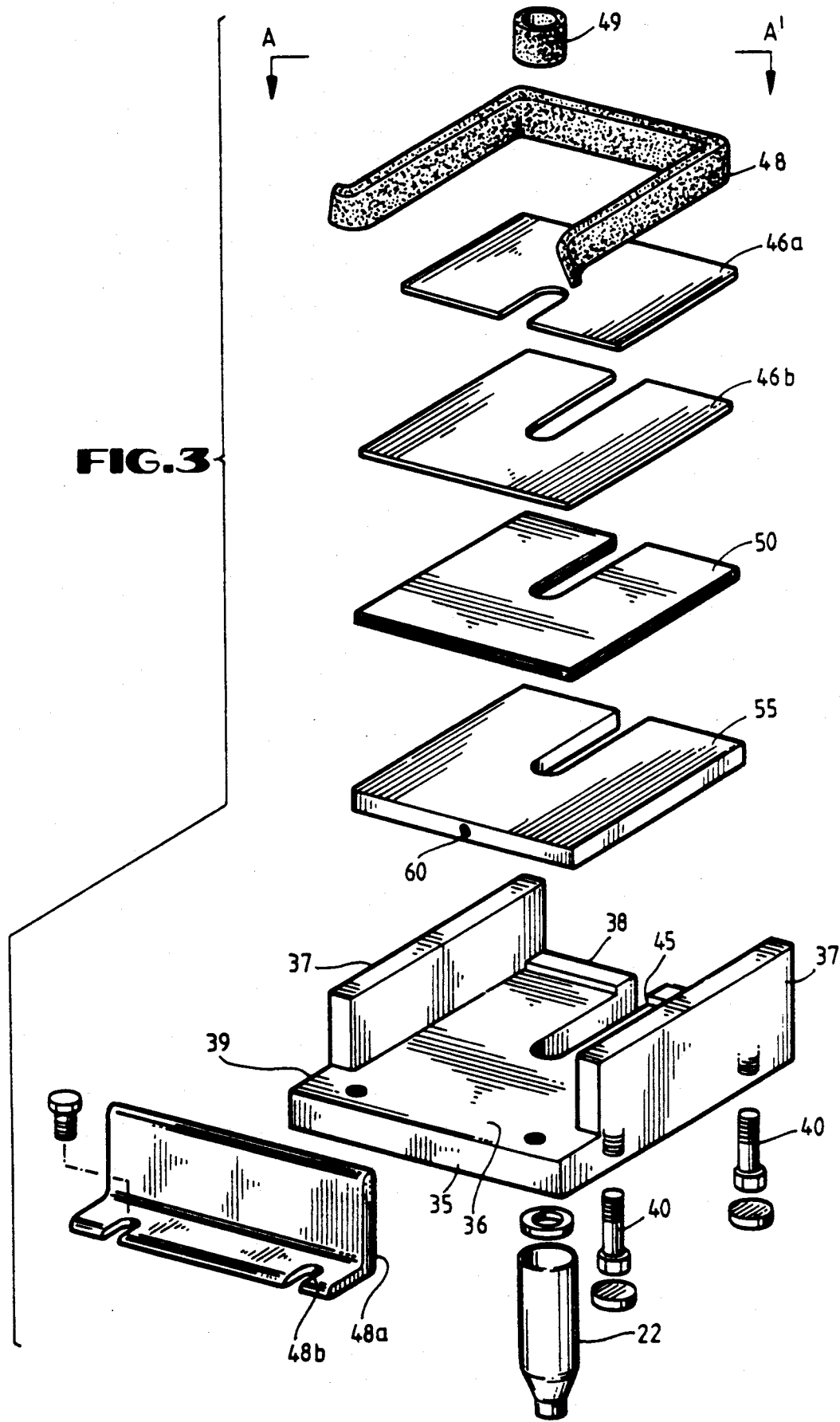
FIG. 3 is an exploded perspective illustration of certain components of the system, particularly a poured-in-place frame chock, from the opposite direction, i.e., looking inward from the outside of the foundation, as shown by the line A—A'.

As shown in detail in FIG. 3, the base chock 35 is formed with a flat horizontal floor 36 and two vertical walls 37. A lip 38, generally about one-eighth of an inch, may be formed at the inward end of the base chock 35, the term inward being used relative to the frame 10.

The floor 36 and walls 37 of the base chock 35 thus form a channel approximating the shape of a broad, shallow U. As will be seen, the preferred height of the two vertical walls 37 depends on the thickness of other components of the system, since it is desired that the floor 36 support the weight of the frame 10.

An opening 45 in the base chock 35 is provided to accommodate the anchor bolt 20. As shown in perspective in FIG. 3, the opening 45 is preferably an open slot, rather than a closed circle or other closed shape, to permit the base chock 35 to slide on or off the anchor bolt 20 without removing the bolt. This can be particularly useful in retrofitting the system to installed machinery without the need to remove the machinery from its existing foundation. The particular machine or other load may have an existing jacking bolt or other object near the anchor bolt that would interfere with insertion of the base chock 35. In such event, a similar slot-like opening may be provided in the base chock 35 to accommodate the jacking bolt.

The aforementioned placement bolts 40 are preferably fabricated from a relatively weak material compatible with the grout 30 to be used. It is believed that a material such as fiberglass reinforced plastic (FRP) will be compatible with typical epoxy grouts. The material should be compatible with the material for the grout 30 so that the placement bolts 40 may be left in place after machine installation and alignment are complete. The material should be relatively weak so that they will not be capable of carrying any significant static or dynamic load (possibly in an unexpected manner) in the adjusted installation, yet strong enough to support the base chock 35 during the installation process.

A frame chock 47, to abut the frame 10 in operation, is preferably fabricated from a suitable hard material as well known to those of ordinary skill having the benefit of this disclosure. In width, the frame chock 47 is formed to fit upon the floor 36 of the base chock 35, i.e., within the U-channel formed by the floor 36 and the vertical walls 37. In height, the frame chock 47 should be slightly thicker than the height of the base chock 35's walls 37 above the floor 36 so that the weight of the frame 10 will be kept off the walls 37.

The frame chock 47 has a slot-like opening formed therein to permit its insertion and extraction from around the anchor bolt 20. If the frame 10 is excessively worn, the frame chock 47, if prefabricated, may be coated with a fairing compound to improve the joint between them in the usual manner.

Poured-in-Place Frame Chock

In many if not most applications the frame chock 47 will preferably be "poured in place" to mate with the underside of the frame 10. The frame chock will be formed from a pourable epoxy material which hardens as it cures.

Figure 4:
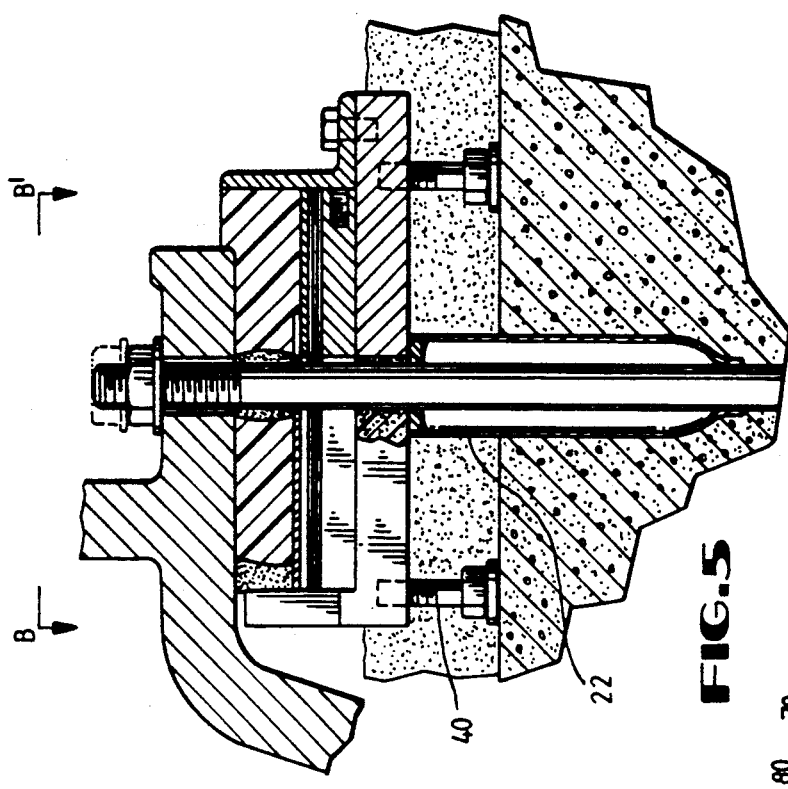
Figure 5:
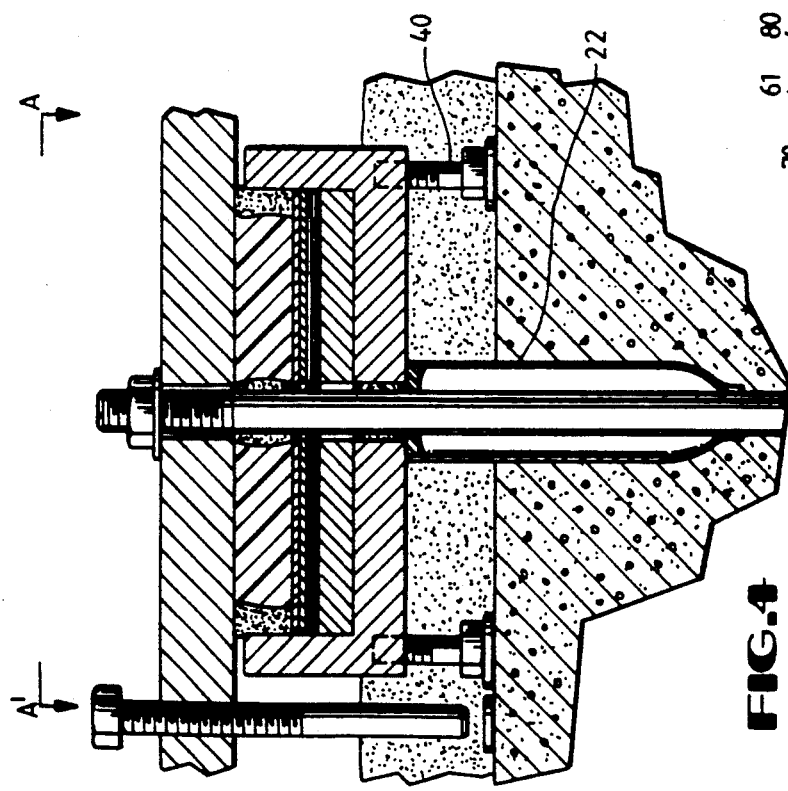
FIG. 5 is a sectional view along the line B—B', perpendicular to the views shown in FIGS. 2 through 4, in connection with a poured-in-place chock.

One manner of pouring the frame chock 47 is depicted in FIGS. 3 through 5. Two shims 46a and 46b, each shaped and having a slot generally like the shims 50 described below, are inserted around the anchor bolt 20 with their slots in opposite directions, so that each of the shims blocks the opening of the slot of the other shim.

To complete the floor formed by the two shims 46a and 46b, a wrapper 49, made of foam rubber or other suitable material, is wrapped around the anchor bolt 20. The wrapper 49 both prevents the epoxy from bonding to the anchor bolt and prevents uncured liquid epoxy from leaking down the slot 45 around the anchor bolt 20.

A soft, pliable strip 48, made of foam rubber or other suitable material, is placed around the perimeter of the shims 46a and 46b within the walls 37 of the base chock 35. A form 48a, made of metal or other suitable material, is bolted or otherwise fastened to the outward end of the floor 36 of the base chock 35, with the ends of the strip 48 trapped between the form 48a and the walls 37.

Preferably, the form 48a has slot bolt holes 48b formed therein to allow adjustment of the form 48a for a tight fit.

A mold is thus formed by the shims 46a and 48b; the strip 48; and the form 48a. Epoxy is poured into this mold and allowed to cure. If desired, the strip 48 may be removed when the epoxy has cured, although this normally will not be necessary. The installation of poured-in-place chocks is believed to be well known to those of ordinary skill and will not be further described here.

Shims may be provided as needed in the system. One or more flat shims 50 is carriable horizontally between the floor 36 and the frame chock 47 by a flat shim carrier 55. The shims 50 and the shim carrier 55 may be formed from any suitable material such as steel or, in some applications, various epoxy compounds. In width, both the shims and the shim carrier are machined to be narrow enough to lie flat within the U-channel of the base chock 35. Both the shims and the shim carrier also have slot-like openings formed therein, to permit insertion and extraction from around the anchor bolt 20.

The shims 50 may be of any convenient thickness, while the shim carrier 55 is thick enough to accommodate a retractor screwhole 60 in its rearward face; a one-half inch thickness is believed to be suitable for the shim carrier 55.

In many applications, it will be useful to fabricate the shims 50 and shim carrier 55 from a magnetic material. If small magnets are embedded in the floor 37 of the base chock 35 (or if the floor 36 itself is magnetized), the magnetic shims 50 and shim carrier 55 will tend to be held in place against the floor 36, thus reducing slippage and bowing.

Figure 7:
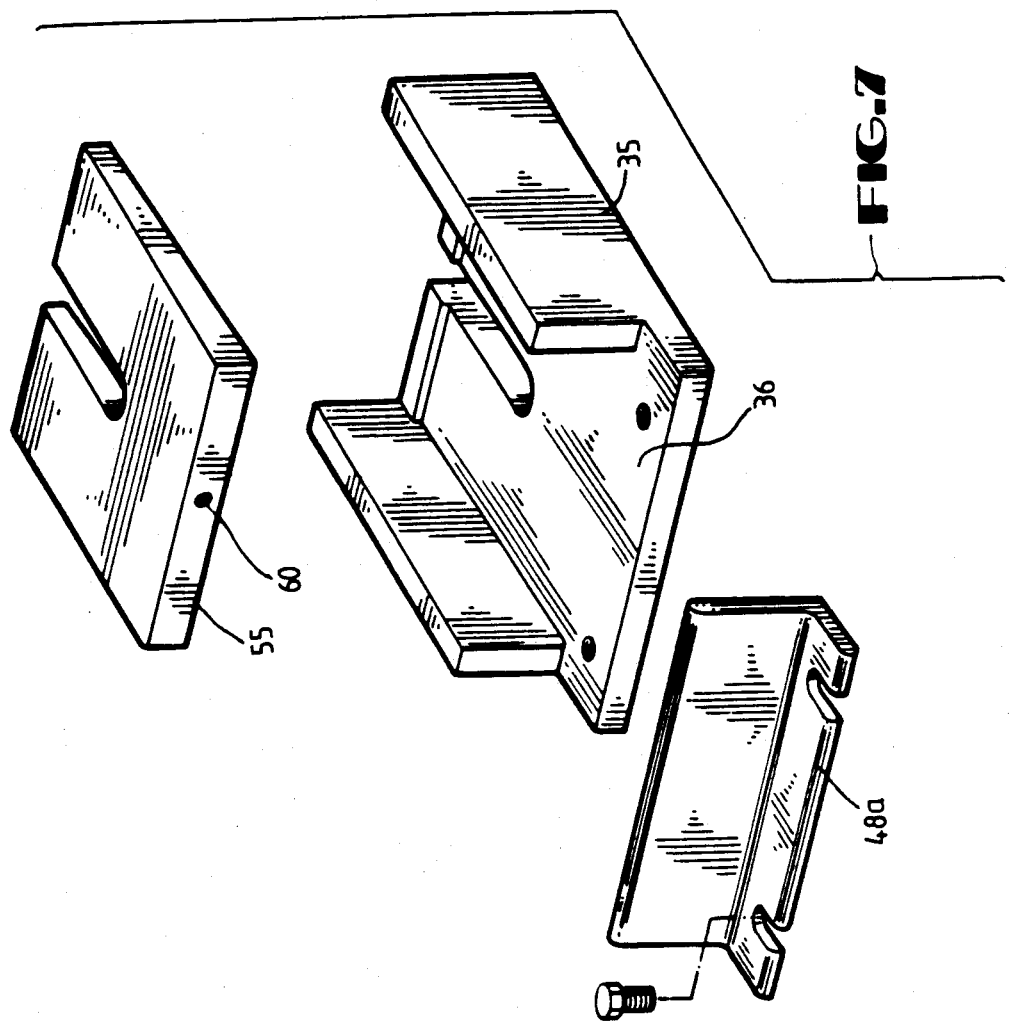
FIG. 7 is an exploded view of the improved component parts.
Figure 6:
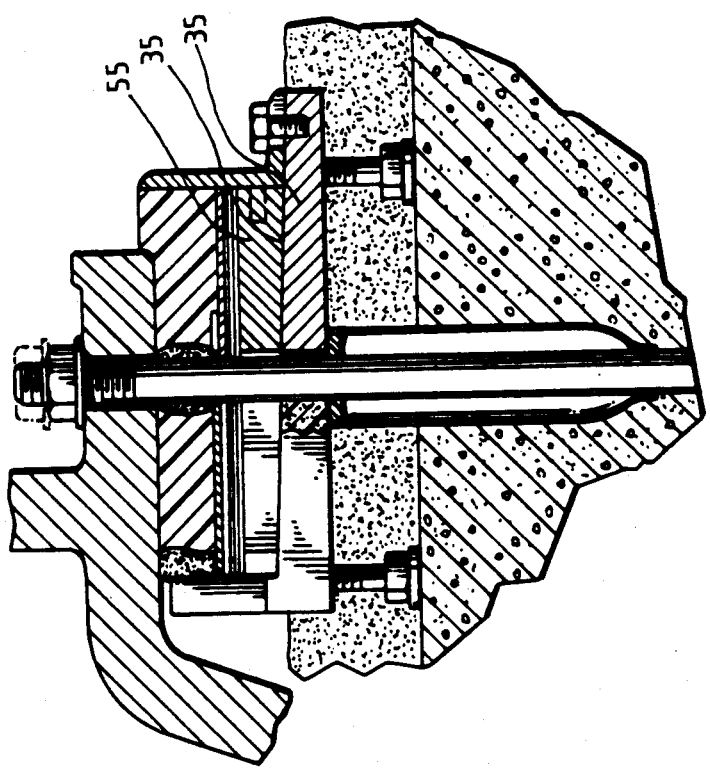
FIG. 6 is a view similar to FIG. 5 showing an improvement in certain component parts of the embodiment described herein.

In an improved embodiment, the shim carrier 55 is preferably tapered in form (shown in FIG. 7 as being generally right triangular in shape) and the floor 36 of the base chock 35 may be correspondingly tapered to receive (what is shown as the lower, hypoteneusal side of) the shim carrier 55, as illustrated in FIGS. 6 and 7. This configuration permits close adjustment of the vertical lift of the shim carrier 55 (and only shims 50 carried thereon) by adjusting the horizontal position of the shim carrier 55 within the base chock 35.

The shim carrier 55 may be held in place by appropriate adjustment of the form 48a. It is estimated that in most applications, approximately 5% of taper (e.g., one-half inch vertical change in ten inches of horizontal change) provides satisfactory vertical lift for the likely acceptable ranges of horizontal adjustment of the shim carrier 55. For example, at 5% of taper, one-sixteenth of an inch of horizontal adjustment will result in approximately 0.003 inches of vertical lift, while three-fourths of an inch of horizontal travel will yield 0.0375 inches of vertical lift. The use of one or more shims 50 as disclosed above, of course, increases the range of adjustable vertical lift. If the shim(s) 50 used are 0.0375 inches thick, practically any desired vertical lift can be achieved by the use of appropriate numbers of shims 50 and adjustment of the shim carrier 55 as needed.

It will be apparent to those of ordinary skill having the benefit of this disclosure that, strictly speaking, the taper of the lower side of the shim carrier 55 may either rise or fall toward the interior of the load being supported. The only requirement is that the floor 36 of the base chock 35 is correspondingly tapered in the same direction to receive the shim carrier 35 so that the upper surface of the shim carrier remains generally parallel to the lower surface of the frame chock 47.

In most applications, however, it will be preferable for the lower side of the shim carrier 55 to taper upward in an inward direction as shown in FIGS. 6 and 7. This puts the thickest part of the shim carrier 55 outward, where it is desired to have at least enough thickness to accommodate the retractor screwhole 60, and facilitating removal of the shim carrier without raising the load. Furthermore, an upward-inward taper, such as that shown, causes any downward slippage of the shim carrier 55 to be back toward the form 48a. The form 48a, by holding the shim carrier 55 in place horizontally against such slippage, helps preserve the precise placement of the shim carrier and thus helps preserve the vertical alignment of the apparatus.

Those of ordinary skill having the benefit of this disclosure will recognize that neither the shims 50 nor the shim carrier 55 are strictly necessary in the system, but may be provided as desired to give additional flexibility in establishing a precise alignment. Likewise, the retractor screwhole 60 need not be included, but may be provided as desired for ease of removal.

Assembly and Alignment

The assembly and alignment of the system is described here in conjunction with a grouted foundation. The apparatus is assembled, and the frame 10 anchored, in steps. The jacking bolt(s) 25 are used to position the frame 10 to the desired level. If a prefabricated frame chock 47 is used, it is laid on the upper surface of the floor 36 of the base chock 35.

If any shims 50 carried upon the shim carrier 55, or the shim carrier 55 by itself, are desired, they are placed between the prefabricated frame chock 47 and the base chock 35. The shims 50 and shim carrier 55 are oriented so that the slots in each will permit them to be slipped around the anchor bolt 20. The vertical walls 37 of the base chock 35 thus constrain the side-to-side movement of the frame chock 47 and, if used, the shims 50 and shim carrier 55. Likewise, the lip 38 and the form 48a constrain the back-and-forth movement of those components (as does the anchor bolt 20 in one direction).

The placement bolts 40 are adjusted so that the base chock 35, the frame chock 47, and the shim carrier 55 and any desired shims 50 if used, are held snugly to the frame 10, the frame chock 47 abutting the frame 10, with the anchor bolt 20 passing through the slots in each. Grout 30 is then poured in the usual manner. It is desired that the space below the lower surface of the floor 36 of the base chock 35 be filled with grout, but that the level of the grout does not rise above the upper surface of the floor 36 to thereby flood the channel of the U formed by the base chock 35.

The grout 30 is permitted to set. When the grout is sufficiently cured, the jacking screws 25 may be backed off. At this point the load of the frame 10 should rest on the frame chock 47; any shims 50 and the shim carrier 55 if used; the base chock 35; and finally on the grout 30 and the foundation 15.

If a poured-in-place frame chock 47 is used instead of a prefabricated frame chock, the steps are generally the same, except that the frame chock 47 is preferably poured and allowed to cure after the grout 30 has cured.

Both cold- and hot realignment of the machine may be performed as follows. The jacking screws 25 or other suitable device are used to take up the weight of the frame 10 again. If used, the shim carrier 55 and any shims 50 are removed; the retraction screwhole 60 in the shim carrier permits convenient removal by inserting a screw therein and using it to withdraw the shim carrier laterally. Shims 50 may then be added or subtracted as desired; the shim carrier 55 and any shims 50 are reinserted; and the jacking screws 25 are backed off to retransfer the load to the system.

IMPROVED ALTERNATIVE EMBODIMENTS

Lock Plate

Figure 8:
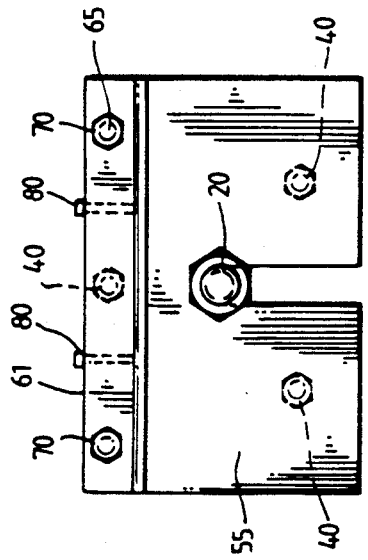
FIG. 8 is a plan view of an alternative embodiment.

In an alternative embodiment, the form 48a may be replaced by a lock plate 61 shown in FIG. 8. The lock plate 61 may comprise a suitable material such as a flat steel bar approximately ⅜ inches deep by 2 inches wide and of a suitable length. The lock plate 61 includes a plurality of circular plate holes 65 each formed in the lock plate 61 to receive a plate bolt 70, which may be coated with a TEFLON ® or other suitable nonstick material.

As shown in FIG. 8, the dimension of the lock plate 61 and the positioning of the plate holes 65 are arranged so that a gap exists between the lock plate 61 and the edge of the engine chock 55 (which was previously identified herein as the shim carrier 55; the term "engine chock" is used in this embodiment because, as noted above, the shim carrier can be used as without shims, i.e., as an engine chock). Exact thicknesses of key stock, shim stock, or similar material can thus be used to fill the gap.

The thickness of shim stock or other material that is used will constrain the horizontal position of the tapered engine chock 55, and will thereby constrain the vertical adjustment of the engine chock. For example, with a suitable taper, insertion of one piece of 0.030 feeler gauge stock will result in a vertical adjustment of 0.001 inch.

The plate bolts 70 are offset from the centerline of the lock plate 61; thus, if a negative vertical adjustment of the engine chock 55 is required, the lock plate 61 can simply be turned over to make room for the engine chock 55 to move outward or "downhill".

The lock plate 61 may also include one or more openings through each of which a set screw 80 may be threaded and tightened against the shimming for greater positive control.

Improved Base Clock

As a further improvement, the tapered surfaces of the base chock 35 and the engine chock 55 may be serrated. The serrations on each surface can be spaced a horizontal distance apart that corresponds to a vertical adjustment of, e.g., 0.002 inch. Such serration aids in precise adjustment of elevation and additionally helps lock the two surfaces together in operation.

The base chock 35 can be provided with ridges or random holes in its bottom to help create a more secure bond with the underlying poured grout. In addition, it has been found in practice that the base chock 35 achieves acceptable results when fabricated without the walls 37.

The placement bolts 40, which support the base chock 35 during the grouting-in process, can be arranged approximately in a triangle as shown in FIG. 8. Thus, the base chock 35 can be leveled as desired by adjusting one or more of the placement bolts 40.

The base chock 35 can be further improved by making it somewhat wider than the engine chock 55 and notching it to receive a jacking bolt assembly (not shown) similar to the jacking bolt 25. The jacking bolt assembly may be a conventional assembly including, e.g., screw sections and a threaded collar. The jacking bolt assembly can thus conveniently be permanently grouted in place in a conventional manner; the notch in the base chock 35 helps support the jacking bolt assembly. When grouting is complete, the jacking bolt assembly can be used for subsequent adjustments in lieu of the jacking bolts 25. Making the base chock 35 somewhat wider than the engine chock 55 eliminates the need to notch the engine chock 55 to receive the jacking bolt assembly; furthermore, since the jacking bolt assembly will be outside the engine chock 55, it may be more readily adjusted with, e.g., a wrench on the hex flats or a spanner wrench in spanner holes.

Replacing Existing Chock

The apparatus disclosed can be advantageously used as a convenient and flexible means of replacing an existing engine chock. Replacement of an existing chock may be desired for several reasons, including a need to increase the elevation of the machine frame 10 or a need to replace a worn or fretted or loose existing chock. (A common expression relates to a machine "spitting out" an old worn chock.)

Such use may entail applying a "fairing" compound (e.g., various well-known forms of "epoxy metal") to the underside of an old and perhaps uneven frame 10 already mounted on an existing structure similar to the foundation 15, such as a rail or soleplate. One method of application will be described for purposed of illustration.

Epoxy metal (e.g., the well-known "Belzona" or equivalent) is applied both to the underside of the frame 10 and to the top of the soleplate, as well as on the shoulder of the machine in the overhang area if any. The base chock 35 is leveled as described above in the bed of epoxy metal on the top of the soleplate.

A conventional nonstick release agent is applied (e.g., by spraying) to the top, sides, and slot of the engine chock 55. The engine chock 55 is then pushed into placed as described above, squeezing out excess epoxy metal, until the engine chock 55 reaches an appropriate neutral point (i.e., a point wherein the frame is nominally expected to be suitably adjusted vertically). A mirror and flashlight can be used to verify that excess material is evidence at all edges, indicating a full bedding of epoxy material.

The epoxy metal can then be allowed to set (possibly using a hydraulic jack or similar apparatus to uniformly push the engine chock 55 in place). The engine chock 55 can then be removed (using the retraction screwhole 60 if necessary). The bottom of the frame 10 may then be inspected for true, uniform epoxy metal application.

A portion of the engine chock 55, e.g., about ¾ inch, may then be sawed off the end (usually the narrower end, but either end will suffice) of the engine chock. This leaves room for ¾ inch of travel by the engine chock past the neutral point if positive vertical adjustment is later needed. Thus, both positive and negative adjustment about the neutral point can be achieved by moving the engine chock 55 either in or out.

The top perimeter of the engine chock 55 may be beveled approximately 1/16 inch (including its lot) to permit the engine chock to be reinstalled and be slightly smaller than the matching epoxy metal surface of the bottom of the frame 10.

Some Uses of the Chock System

The subject matter described above can be put to several advantageous uses. Some of these uses are illustrated below.

When the underside of the machine frame 10 has been suitably machined smooth, the base chock 35 and the engine chock 55 may be advantageously used, without the frame chock 47, as an adjustable chock system. If desired, the base chock 35 can be locked in place using epoxy metal, as described above; the engine chock 55 remains adjustable.

If the underside of the machine frame 10 and/or the foundation 15 (e.g., a steel rail or soleplate foundation) was once machined smooth but is now fretted or otherwise irregular, the method of applying a fairing compound discussed above may be used to patch the irregularities. If it is desired to lock the base chock 35 in place, only the engine chock 55 is treated with nonstick material to make it removable; on the other hand, in some situations it may be desirable for both the base chock 35 and the engine chock 55 to be removable, in which case both can be treated with the nonstick material.

The frame chock 47 may be used as desired; if the underside of the machine frame 10 is waffled, it may be desirable to utilize a poured-in-place chock for the frame chock as described above.

It will be appreciated by those skilled in the art having the benefit of this disclosure that this invention is believed to be capable of application in other situations. Accordingly, this description is to be construed as illustrative only and as for the purpose of teaching those skilled in the art the manner of carrying out the invention.

It is also to be understood that the form of the invention shown and described is to be taken as the presently preferred embodiment. Various modifications and changes may be made, e.g., in the shape, size, and arrangement of parts, without departing from the spirit and scope of the invention as set forth below in the claims. It is intended that the following claims be interpreted to embrace all such modifications and changes.

What is claimed is:

1. A method of adjusting the vertical position of a frame or other weight located on a foundation, comprising the steps of:
    (a) applying a fairing compound to the underside of said frame and to the upper surface of said foundation;
    (b) leveling a base chock in said fairing compound previously applied to said foundation, said base chock having a tapered upper surface and being located between said frame or other weight and said foundation;
    (c) applying a nonstick agent to an engine chock, said engine chock having a tapered lower surface;
    (d) pushing said engine chock between said frame and said base chock to a nominal neutral position at which said frame is adjusted vertically, thereby squeezing out excess fairing compound;
    (e) allowing said fairing compound to set;
    (f) removing said engine chock; and
    (g) sawing off a portion of said engine chock to allow for travel by said engine chock past said neutral position.

* * * * *

UNITED STATES PATENT AND TRADEMARK OFFICE
CERTIFICATE OF CORRECTION

PATENT NO. : 5,016,338
DATED : MAY 21, 1991
INVENTOR(S) : ROBERT L. ROWAN, JR.

It is certified that error appears in the above-identified patent and that said Letters Patent is hereby corrected as shown below:

In column 4, line 4, change "48b" to --46b--.

Signed and Sealed this

Seventeenth Day of September, 1991

Attest:

HARRY F. MANBECK, JR.

Attesting Officer     Commissioner of Patents and Trademarks